United States Patent [19]

Huang

[11] Patent Number: 5,730,669
[45] Date of Patent: Mar. 24, 1998

[54] HANDLE GRIP AND METHOD OF MAKING SAME

[76] Inventor: Ben Huang, 19472 Woodlands La., Huntington Beach, Calif. 92648

[21] Appl. No.: 787,828

[22] Filed: Jan. 23, 1997

Related U.S. Application Data

[63] Continuation of Ser. No. 567,339, Dec. 28, 1995, abandoned, which is a continuation-in-part of Ser. No. 542,009, Nov. 13, 1995, Pat. No. 5,645,501, which is a continuation-in-part of Ser. No. 58,313, May 3, 1993, which is a continuation-in-part of Ser. No. 953,190, Sep. 29, 1992, abandoned, which is a continuation-in-part of Ser. No. 890,383, May 26, 1992, abandoned, which is a continuation-in-part of Ser. No. 637,931, Jan. 14, 1991, abandoned.

[51] Int. Cl.⁶ .......................... A63B 49/08; A63B 53/14
[52] U.S. Cl. .............................. 473/549; 473/302
[58] Field of Search ........... 273/73 J, 75; 473/300–303, 473/549

[56] References Cited

U.S. PATENT DOCUMENTS

| | | | |
|---|---|---|---|
| 1,139,843 | 5/1915 | Brown . | |
| 1,556,781 | 10/1925 | Gjorup . | |
| 1,701,856 | 2/1929 | Kraeuter . | |
| 1,940,104 | 12/1933 | Russell et al. | 273/81 |
| 1,943,399 | 1/1934 | Smith | 273/81 |
| 2,003,917 | 6/1935 | Bowden | 273/75 |
| 2,046,164 | 6/1936 | Herkner | 273/81 |
| 2,086,062 | 7/1937 | Bray | 273/81 |
| 2,166,044 | 7/1939 | Fletcher | 273/75 |
| 2,166,045 | 7/1939 | Fletcher | 273/75 |
| 2,513,655 | 7/1950 | Lamkin et al. | 273/81 |
| 3,582,456 | 6/1971 | Stolki | 161/165 |
| 3,654,066 | 4/1972 | Fukushima et al. | 161/160 |
| 3,845,954 | 11/1974 | Case | 273/75 |
| 3,848,480 | 11/1974 | Oseroff | 74/558.5 |
| 3,848,871 | 11/1974 | Sweet | 273/75 |
| 3,860,469 | 1/1975 | Gregorian et al. | 156/83 |
| 3,881,521 | 5/1975 | Johansen et al. | 138/126 |
| 3,899,172 | 8/1975 | Vaughn et al. | 273/73 |
| 4,015,851 | 4/1977 | Pennell | 273/75 |
| 4,044,625 | 8/1977 | D'Haem | 74/558.5 |
| 4,070,020 | 1/1978 | Dano | 273/73 |
| 4,100,006 | 7/1978 | Buckley | 156/78 |
| 4,174,109 | 11/1979 | Gaiser | 273/81.6 |
| 4,284,275 | 8/1981 | Fletcher | 273/75 |
| 4,347,280 | 8/1982 | Lau et al. | 428/304.4 |
| 4,454,187 | 6/1984 | Flowers et al. | 428/159 |
| 4,567,091 | 1/1986 | Spector | 428/222 |
| 4,647,326 | 3/1987 | Pott | 156/77 |
| 4,660,832 | 4/1987 | Shomo | 273/73 |
| 4,662,415 | 5/1987 | Proutt | 150/52 |
| 4,736,949 | 4/1988 | Muroi | 273/73 |
| 4,765,856 | 8/1988 | Doubt | 156/212 |
| 4,853,054 | 8/1989 | Turner et al. | 156/78 |
| 4,934,024 | 6/1990 | Sexton | 16/111 |
| 5,042,804 | 8/1991 | Uke | 273/75 |
| 5,110,653 | 5/1992 | Landi | 428/116 |
| 5,275,407 | 1/1994 | Soong | 273/73 |

FOREIGN PATENT DOCUMENTS

| | | |
|---|---|---|
| 2398099 | 7/1977 | France . |
| 2805314 | 7/1979 | Germany . |
| 3414978 | 10/1985 | Germany . |
| 443228 | 2/1936 | United Kingdom . |
| 870021 | 6/1961 | United Kingdom . |
| 979242 | 1/1965 | United Kingdom . |

*Primary Examiner*—William E. Stoll
*Attorney, Agent, or Firm*—Fulwider Patton Lee & Utecht, LLP

[57] ABSTRACT

A shock absorbing grip for the handle of a tennis racquet or golf club having a polyurethane layer bonded to a felt layer. The bonded-together layers are configured as a strip which is wrapped about the handle with the side edges being formed with recessed reinforcement side edges which are tightly butted together. The reinforcement edges may be heat bonded together, if desired.

16 Claims, 9 Drawing Sheets

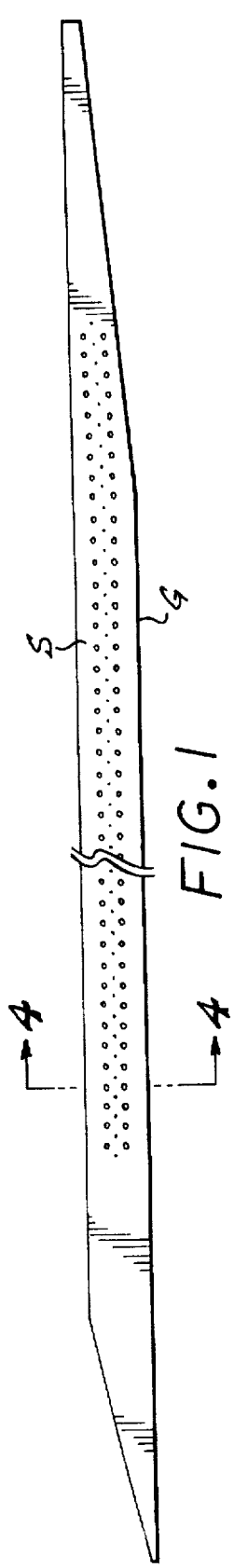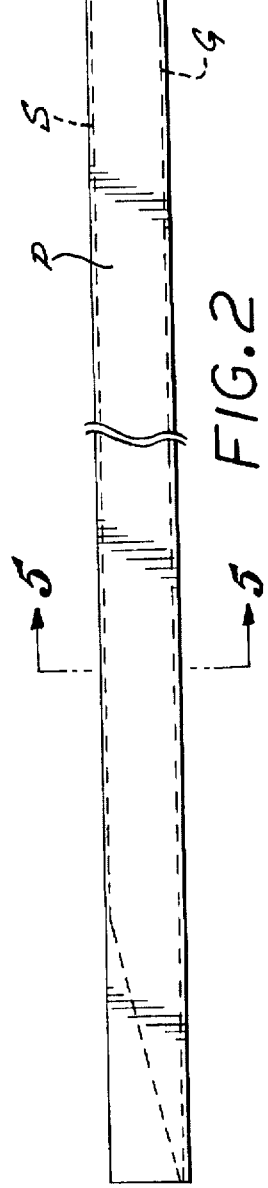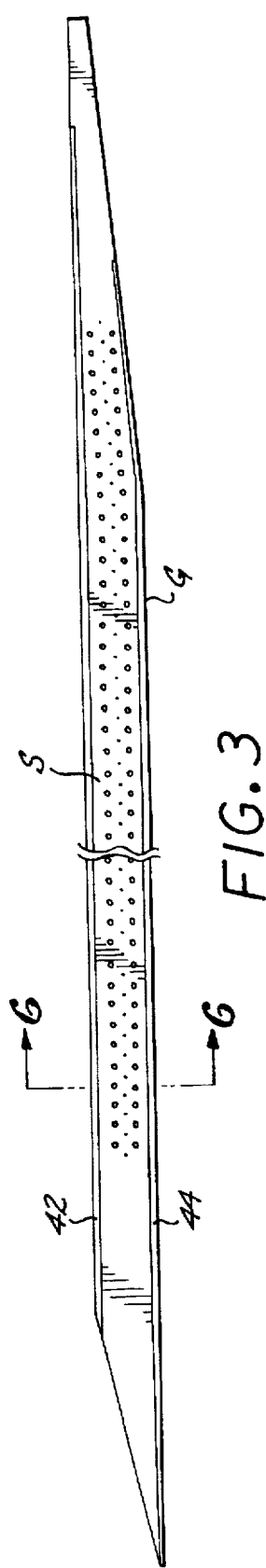

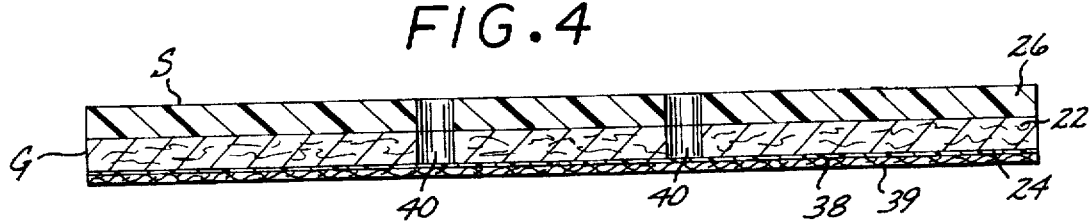
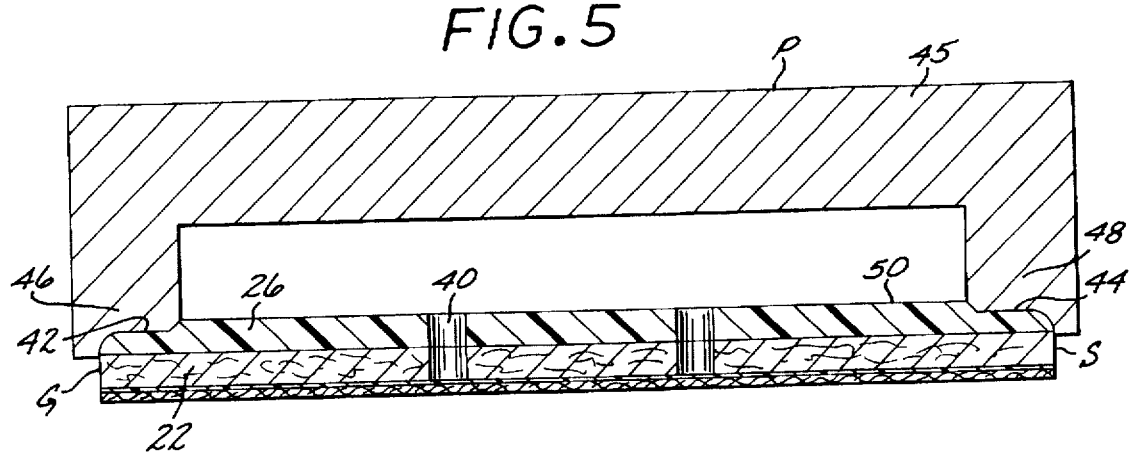
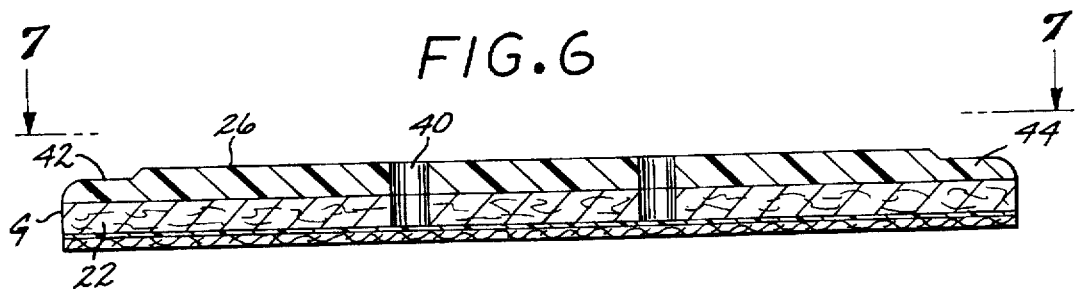
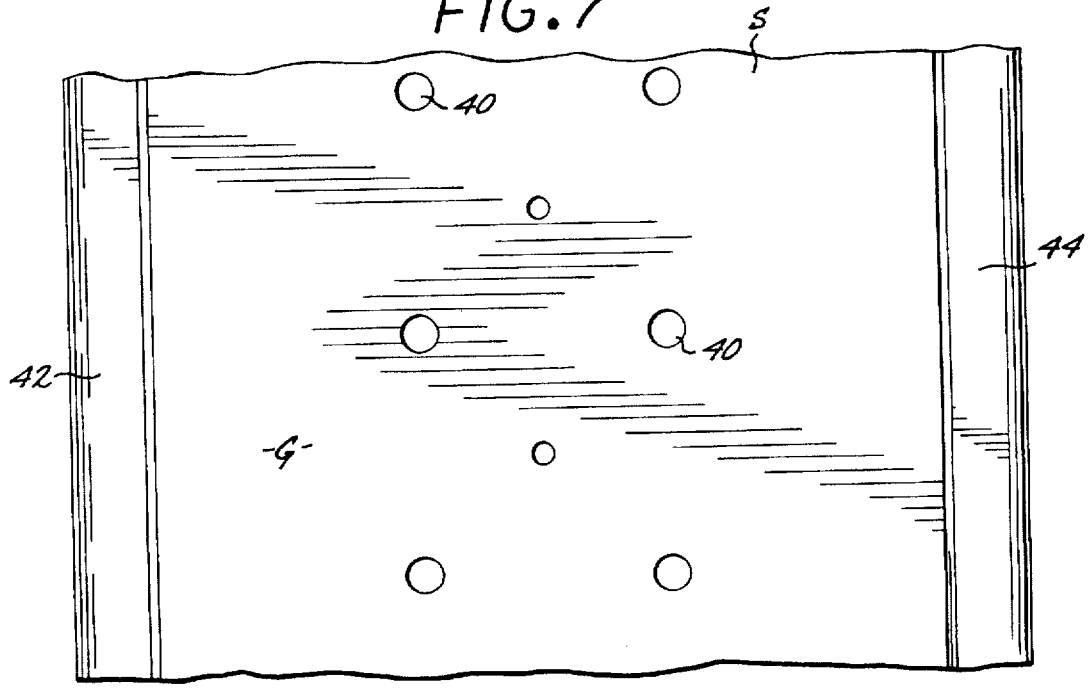

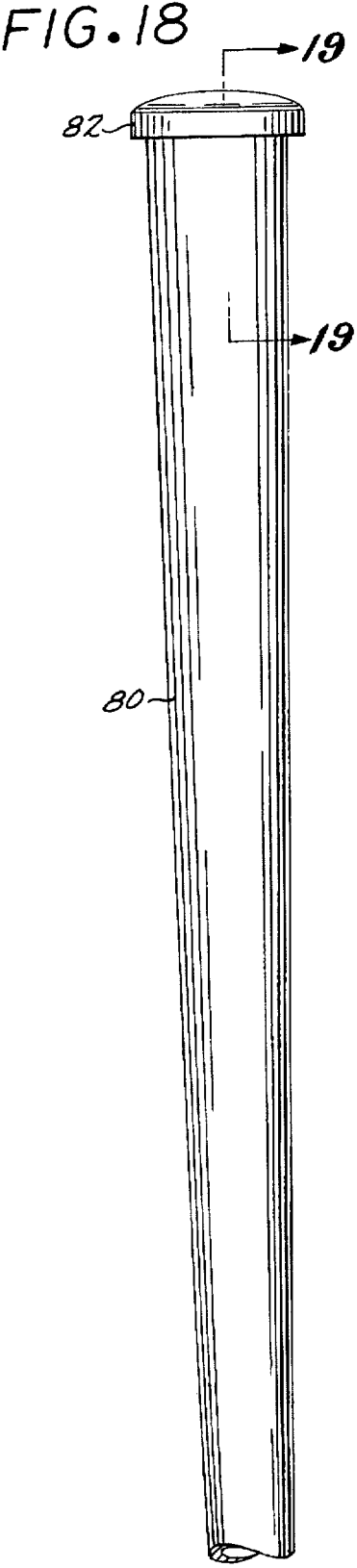
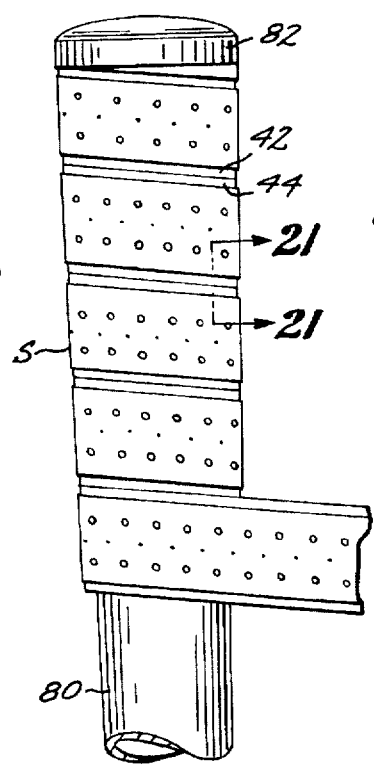
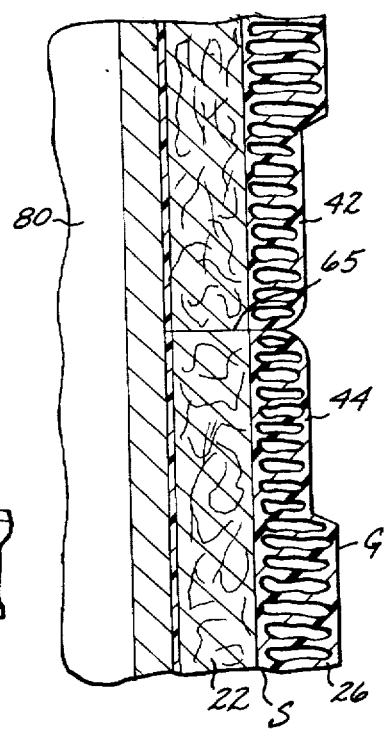
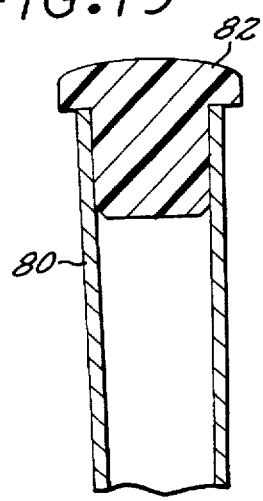
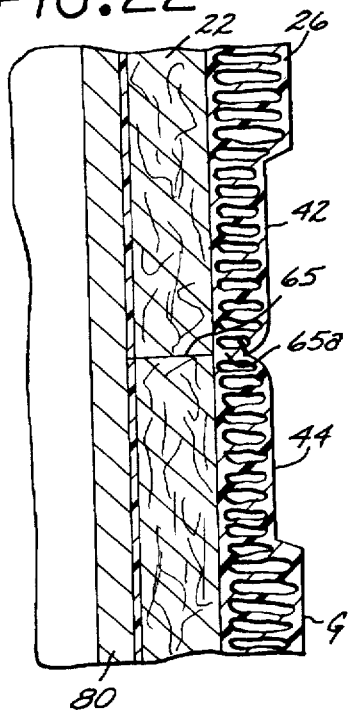

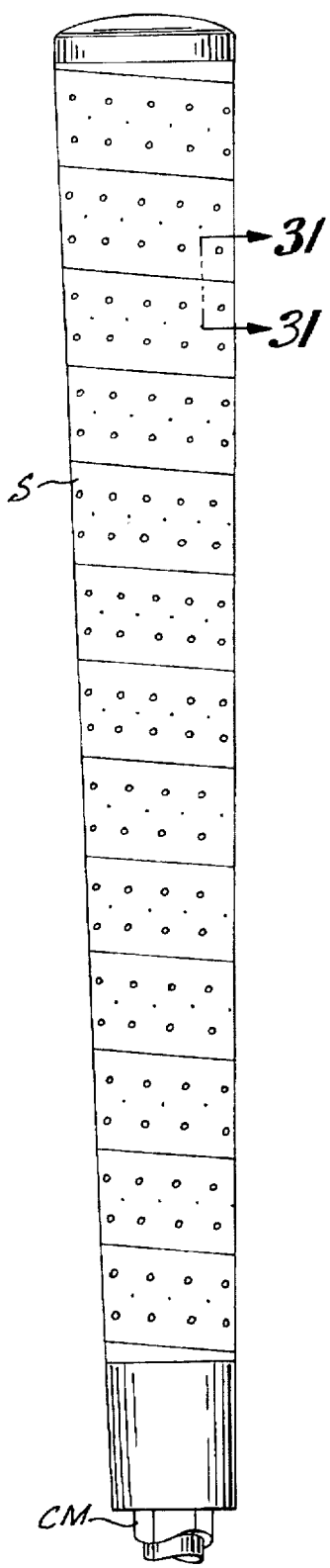
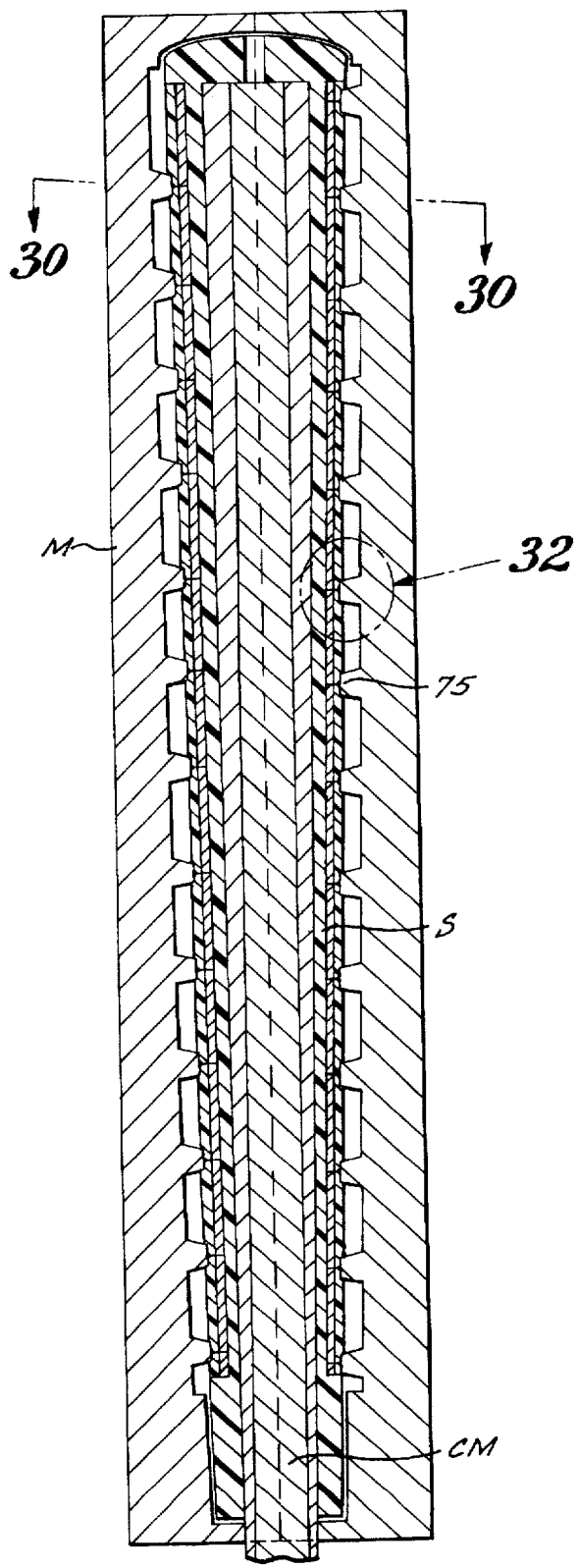
FIG. 28
FIG. 29

HANDLE GRIP AND METHOD OF MAKING SAME

This application is a continuation of U.S. Ser. No. 08/567,339, filed Dec. 28, 1995, now abandoned, which was a continuation-in-part of Ser. No. 08/542,009, filed on Nov. 13, 1995, now U.S. Pat. No. 5,645,501, which is a continuation-in-part of /u.S. Ser. No. 08/058,313, filed May 3, 1993, which is a continuation-in-part of U.S. Ser. No. 07/953,190, filed Sep. 29, 1992, now abandoned, which is a continuation-in-part of U.S. Ser. No. 7/890,383, filed Jun. 26, 1992, now abandoned which is a continuation-in-part of U.S. Ser. No. 07/637,931, filed Jan. 14, 1991, now abandoned.

BACKGROUND OF THE INVENTION

The present invention relates to an improved grip for racquets and other devices employing handles that are subject to shock when such devices are impacted, as for example, tennis ball racquets, racquetball racquets, golf clubs, baseball bats and hammers.

It is well known that shock generated by impact between a device such as a tennis racquet and a tennis ball can affect muscle tissue and arm joints such as elbow joints. Such shock often results in "tennis elbow" which is a painful affliction commonly experienced by active tennis players. Medical theories attribute "tennis elbow" to continuous exposure of the playing arm of a tennis player to shock and vibration generated by stalking a tennis ball with a tennis racquet. The energy generated is usually of high frequency and short duration with rapid decay, and which is often known as "impact shock." Tight grasping of a grip to keep it from slipping contributes to "tennis elbow." Various types of grips have been proposed for inhibiting "tennis elbow," however, such grips have not solved such problem. The grip of the present invention successfully reduces or even eliminates "tennis elbow" type shock to the muscle tissue and arm joints of the users of tennis racquets, racquetball racquets, golf clubs, baseball bats, and other impact imparting devices such as hammers.

Conventional prior art grips of this type have conventionally utilized a layer of polyurethane backed with a layer of felt. In general, the felt layer has a thickness of about 1.40 mm. The polyurethane layer is generally thinner than 0.25 mm, and has been considered only as providing tackiness, i.e., resistance to the slip caused by a sweaty hand. The polyurethane has not been considered to be useful for inhibiting shock. The felt was relied upon to cushion the user's arm and hand against the shock created when the ball hits the racquet.

Applicant has previously developed resilient grips which successfully reduce or even eliminate "tennis elbow" type shock to the muscle and arm joints of the users of tennis racquets, racquet ball racquets, golf clubs, baseball bats and other impact imparting devices such as hammers. See, for example, U.S. Pat. No. 5,374,059 granted to applicant Dec. 20, 1994. Such earlier grips utilize a polyurethane layer bonded to a felt layer to define a strip which is spirally wrapped around the handle of a racquet or the like to conform to the external configuration of such handle. In such earlier grips of applicant's design the thickness of the polyurethane layer relative to the thickness of the felt layer as compared to prior art resilient grips, i.e. the ratio of the thickness of the polyurethane layer to the thickness of the felt layer was a minimum of approximately 0.18, with the thickness of the polyurethane layer having been about equal to or thicker than the thickness of the textile layer in a typical grip of my design. In such grips the handle-abutting side of the strip utilized skiving, with the felt layer tapering from a transverse central region upwardly and outwardly towards the transverse side edges of the strip. The side edges of the strip were overlapped as the strip was wrapped around the handle so that the strip did not have a smooth configuration along its length. Additionally, the skiving tended to weaken the grip. Moreover, the side edges of the strip tended to unravel in use. It was also determined that where the strip was not properly applied to the handle, the grip would tend to loosen relative to the handle.

It is also known that golfers commonly sustain injuries resulting from shock transferred from a golf club to the golfer's back, wrists, elbows, shoulders and knees during a golf swing.

SUMMARY OF THE INVENTION

Applicant has discovered that polyurethane and felt grips of the aforedescribed nature can be made without skiving to thereby afford a stronger, longer lasting grip. By eliminating skiving, the grip of the present invention provides a longer lasting stronger grip which resists unraveling in use. Additionally, since the side edges of the strip are butted together as the strip is wrapped about the handle, the grip provides a smoother configuration over the entire grip surface. The improved grip of the present invention also incorporates an adhesive material that covers the inner surface of the felt layer to facilitate wrapping the strip about the handle and afford increased securement of the grip to the handle as the grip is used, with the tighter the grasp of the player the tighter the securement of the grip to the handle. The grip of the present invention additionally reduces the manufacturing time and therefore the cost of the grip to the user as compared to prior grips. Moreover, it is easier to properly wrap the strip onto the handle so as to obtain a firm attachment of the grip to the handle.

The grip of the present invention also utilizes sidewardly and outwardly curved reinforcement side edges along its length. Such slide reinforcement edges inhibit unraveling of the grip from the racquet or golf club handle, enhances the frictional grip of the user and provides an improved appearance over existing grips. Where the grip is applied to golf clubs, it reduces interference with other golf club grips as club grip is withdrawn from a golfer's bag. The reinforcement side edges can be heat bonded together if desired for improved results. The grip of the present invention may either be used to as a replacement grip, or, alternatively be fabricated as original equipment by a manufacturer of golf clubs. Additionally, the grip may include a tapered robber-like sleeve about which the strip is spirally wrapped, or the strip may be spirally wrapped directly upon the handle portion of golf club shaft where the shaft is tapered to the configuration of the sleeve.

The golf club grip of the present invention has been found to greatly cushion the shock transferred from a golf club to the golfer's body and thereby prevent the danger of injury to the golfer during a golf swing.

These and other features and advantages of the present invention will become apparent from the following detailed description, when taken in conjunction with the accompanying drawings.

BRIEF DESCRIPTION OF THE DRAWINGS

FIG. 1 is a top plan view of resilient grip embodying the present invention before it is formed with sidewardly and outwardly curved reinforcement side edges.

FIG. 2 is a top plan view showing a heated platen utilized to form sidewardly and outwardly curved reinforcement side edges along the length of the grip of FIG. 1.

FIG. 3 is top plan view of the grip of FIGS. 1 and 2 after the sidewardly and outwardly curved reinforcement side edges have been formed along the major portion of the length of such grip.

FIG. 4 is a vertical sectional view taken in enlarged scale along line 4—4 of FIG. 1.

FIG. 5 is a vertical sectional view taken in enlarged scale along line 5—5 of FIG. 2.

FIG. 6 is a vertical sectional view taken in enlarged scale along line 6—6 of FIG. 3.

FIG. 7 is a broken top plan view of the strip taken along line 7—7 of FIG. 6.

FIG. 18 is a broken side elevational view of the upper end of a golf club shaft about which the aforedescribed grip may be wrapped.

FIG. 19 is a vertical sectional view taken along 19—19 of FIG. 18.

FIG. 20 is a broken side elevational view showing a ship of the aforedescribed nature being wrapped about the golf club shaft of FIGS. 18 and 19.

FIG. 21 is a vertical sectional view taken in enlarged scale along line 21—21 of FIG. 20.

FIG. 22 is a view similar to FIG. 21 after the reinforcement side edges of the ship have been heat bonded together.

FIG. 28 is a side elevational view of a resilient sleeve and strip of the type shown in FIG. 1 applied to a collapsible mandrel.

FIG. 29 is a central vertical sectional view showing a heat applying mold similar to that of FIG. 15 which may be used to simultaneously form the recessed reinforcement side edges of a golf club grip embodying the present invention and also bond together the polyurethane layers along such side edges.

DETAILED DESCRIPTION OF PREFERRED EMBODIMENTS

Figure 8:
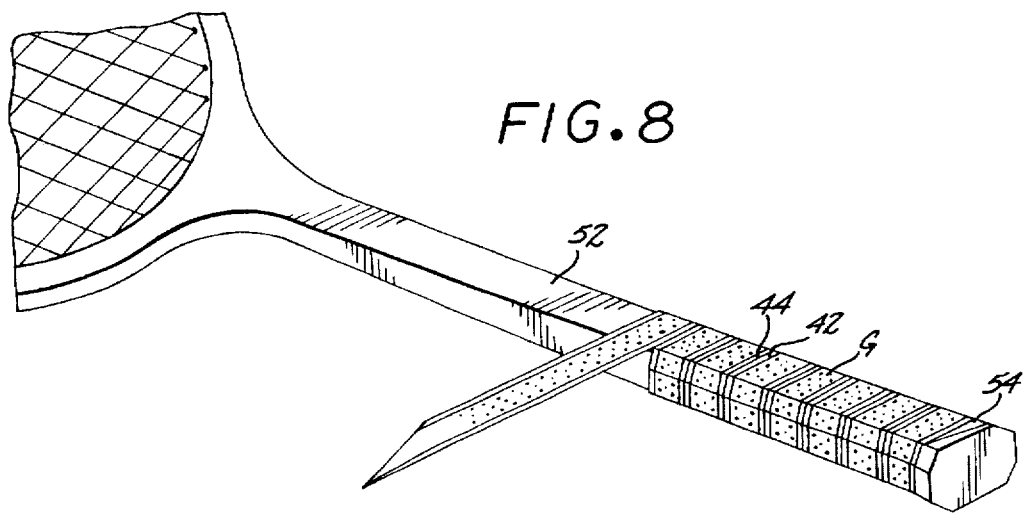
FIG. 8 is a perspective view showing the grip of FIGS. 1–7 being wrapped about the handle of a tennis racquet.
Figure 12:
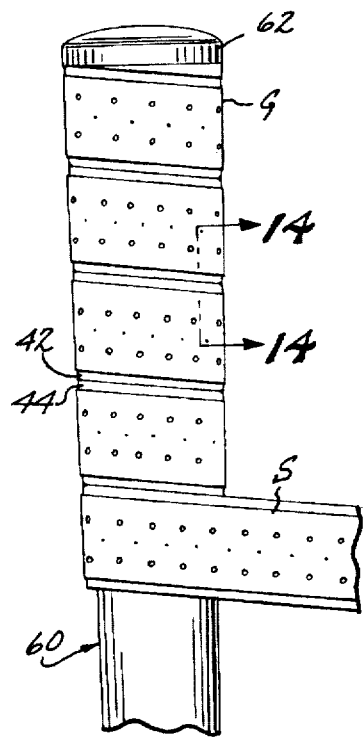
FIG. 12 is broken side elevational view showing a strip embodying the present invention being wrapped about the sleeve of FIG. 11.

Referring to the drawings, a preferred grip G embodying the present invention utilizes an elongated resilient strip S which is spirally wrapped about the handle portion of a tennis racquet, as shown in FIG. 8, or a golf club handle, as shown in FIGS. 12 and 20 respectively. Referring to FIG. 4, grip G includes an open-pored felt layer, generally designated 22, having an inner or bottom surface 24 which is adhered to a racquet handle, a sleeve attached to a collapsible mandrel or directly to a golf club handle. The grip G also includes a smooth closed pore polyurethane layer, generally designated 26, which is bonded to the felt layer 22. The bonded-together polyurethane and textile layers are seen to be configured as the unitary strip S.

Figure 10:
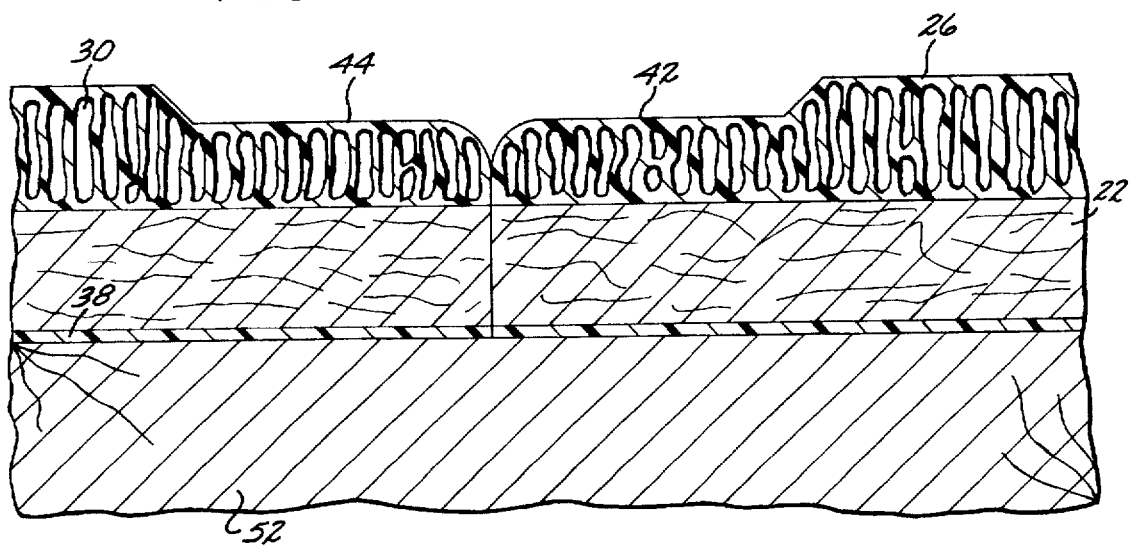
FIG. 10 is a vertical sectional view taken in enlarged scale along line 10—10 of FIG. 9.
Figure 11:
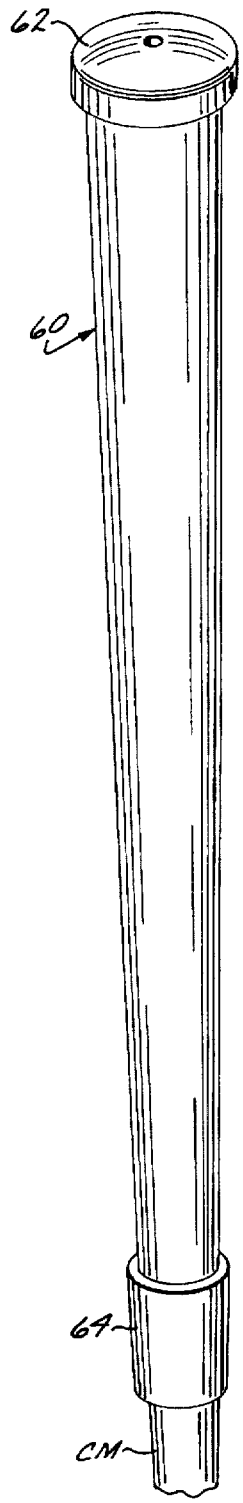
FIG. 11 is a perspective view showing a resilient sleeve applied to the upper portion of a collapsible mandel for use with a resilient strip embodying the present invention.
Figure 14:
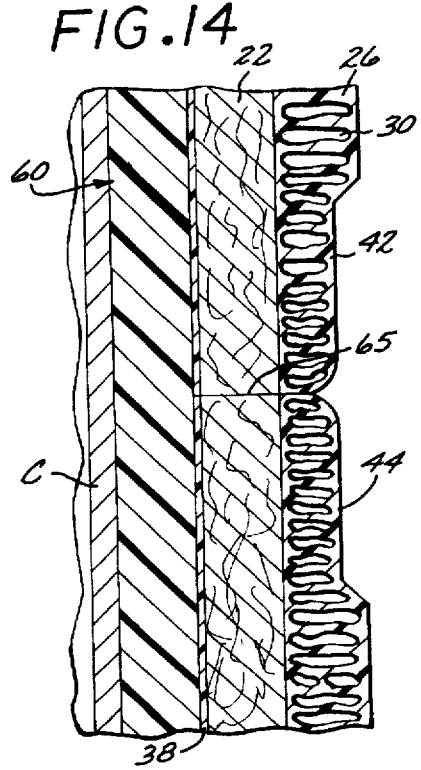
FIG. 14 is a vertical sectional view taken in enlarged scale along line 14—14 of FIG. 12.

More particularly, the felt layer 22 is formed of a suitable open-pored material and has its upper or outer surface bonded to the lower surface 28 of the polyurethane layer 26. As indicated in FIGS. 10 and 14, the polyurethane layer 26 is formed with pores 30 which extend vertically, i.e. generally normal to the longitudinal axis of the strip S and racquet handle or golf club handle when the grip has been affixed to such handle S. The polyurethane layer 26 may be formed in a conventional manner by coating one side of a felt strip with a solution of polyurethane (e.g. polyester or polyether) dissolved in a dimethyl formamide (DMF), immersing the coated strip in water baths to displace the DMF and cause the urethanes to coagulate, and finally driving off the water by the application of pressure and heat. In this manner, the pores 30 will extend perpendicularly relative to the longitudinal axis of the strip, while the underside 28 of the polyurethane layer 26 is bonded to the upper surface of the felt strip. As noted hereinbefore, applicant has discovered that greatly improved shock absorbing qualities may be obtained in a racquet or golf club grip where the thickness of the polyurethane layer to the thickness of the felt layer is increased over the thickness of the felt layer employed in prior art grips. More specifically, applicant considers that the ratio of the thickness of the polyurethane layer to the textile layer should be a minimum of approximately 0.18. In the embodiment shown in the drawings, the thickness of the polyurethane layer is preferably about 0.4 millimeters and the thickness of the felt layer in about 0.9 millimeters. Excellent results have been obtained with this ratio.

The polyurethane layer 26 provides a cushioned grasp of the player's hand on a handle tennis or golf club and also enhances the player's grip by providing increased tackiness between the player's hand and the grip. The felt layer 22 provides strength to the polyurethane layer 26 and serves as a means for attaching the bonded-together polyurethane and felt strip to a handle. As shown in FIGS. 4, 5 and 6, the underside or bottom 24 of the felt layer 22 is provided with a conventional adhesive material 38 which covers the underside of the felt layer. The underside of the adhesive material 38 is originally covered with a protective quick-release tape 39. The polyurethane and felt layers may be formed with vertically extending perforations 40 which enhance the absorption rate of perspiration from a user's hand.

FIG. 1 is a top plan view of the strip S after it has been cut to the proper dimensions to be wrapped about either a tennis racquet or golf club handle.

In FIG. 2, the strip S is shown being formed with sidewardly and outwardly extending recessed reinforcement side edges, generally designated 42 and 44. FIG. 3 shows the appearance of the ship after such reinforcement side edges 42 and 44 have been formed thereon. The reinforcement side edges 42 and 44 are preferably formed along the major portion of the strip by means of a heated platen P shown in FIG. 5. Referring thereto, platen P may be of conventional metal construction having a horizontal base 45 formed at its opposite sides with depending legs 46 and 48. The lower ends of the legs are configured so as to form the recessed reinforcement side edges 42 and 44. Thus, the lower portion of the legs are provided with like—configured mirror image cavities 48 and 50, having a horizontally extending surface, the inner portions of which extend upwardly and inwardly, while the outer edges thereof are curved sidewardly and downwardly. The platen P is heated in a conventional fashion as by means of electrical resistance elements (not shown) and urged downwardly against the sides of the strip S so as to compress side portions of the polyurethane layer 26 below the upper surface of such polyurethane layer in the manner shown in FIG. 5 to define the recessed reinforcement side edges 42 and 44. Such compression increases the strength of the polyurethane layer in the vicinity of the side edges 42 and 44. It has been found that the width of the recessed reinforcement side edges 42 and 44 may be approximately 2 millimeters, while the depth of the major portion thereof may approximate 0.5 millimeters.

Figure 9:
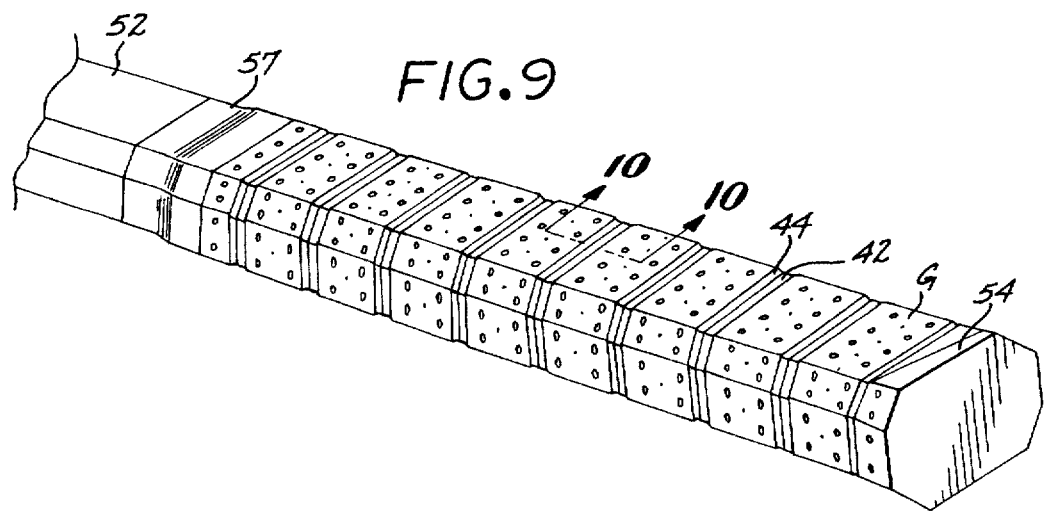
FIG. 9 is a perspective view in enlarged scale showing the grip of FIG. 8 after it has been applied to the handle of a tennis racquet.

Referring now to FIGS. 8, 9 and 10, to apply the strip G to the racquet handle 52, the quick-release tape 39 is peeled off the adhesive 38 on the underside of the felt layer 22. The strip S is then spirally wound around the racquet handle starting with the butt end of the handle. The starting end 54 (relative to the racquet's butt end) may be provided with outwardly and downwardly slanted leading and trailing areas (not shown) on opposite edges of the strip, the rear portion of the leading area slightly overlapping the front portion of the trailing area. The provision of leading and trailing areas permits the strip to be initially wrapped about 1½ times around the butt end of the handle, with a smooth configuration of the ship resulting from the utilization of such slanted overlapped areas. As indicated in FIG. 10, the edges of the strip S do not overlap, and, instead, their radially extending surfaces butt tightly against one another, as shown at 56. It is important to note that the two abutting side edges of the strip afford a very firm contact between these side edges, since the polyurethane layer 26 is compressed by the heating platen P when the recessed reinforcing side edges are formed in the manner shown in FIGS. 5. Such compression increases the strength of the polyurethane material in the vicinity of the butt joint. Such firm contact would not be possible if the strip was formed solely of polyurethane, since polyurethane is quite soft as compared to felt. Tight abutment of the strip's side edges ensure that applicant's strip does not unravel even when the grip is exposed to hard wear during play. If desired an adhesive (not shown) may be interposed between the abutting side edges, of the grip to further inhibit unraveling. As a result, applicant's grip is more durable and hence affords a longer service life than prior art grips. The provision of the recessed reinforcing side edges 42 and 44 further inhibits any tendency of the ship to unravel, enhances the appearance of the grip and improves the frictional contact of the user's hand and the racquet handle. Referring to FIG. 9, the grip G is shown as it appears when applied to the racquet handle 52. Preferably, a length of conventional finishing tape 57 is wrapped about the end of the strip proximate the racquet head to secure the strip to the handle. Also, a robber sleeve (not shown) may be utilized to cover the finishing tape so as to both enhance the appearance of the completed grip G and firmly secure the tape and strip to the racquet handle.

Figure 30:
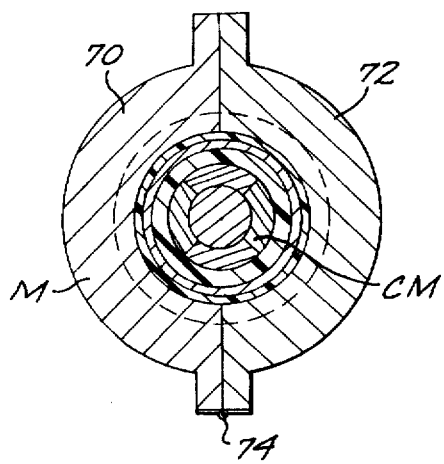
FIG. 30 is a horizontal sectional view taken along line 30—30 of FIG. 29.
Figure 31:
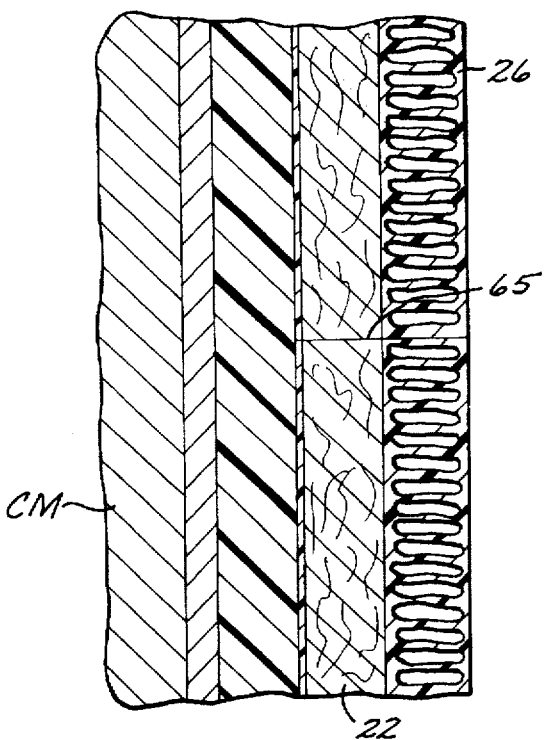
FIG. 31 is an enlarged view is a vertical sectional view taken in enlarged scale along line 31—31 of FIG. 28.

Referring now to FIGS. 11–14, the aforedescribed ship S is shown wrapped around a resilient robber-like sleeve, generally designated 60, of synthetic plastic foam or robber construction utilizing a cap 62 to define a unitary, integral grip embodying the present invention. The lower portion of sleeve 60 is formed with a guide cylinder 64. Sleeve S is adapted to be slipped over the top of a collapsible mandel CM of conventional construction having a tapered configuration similar to the handle portion of golf club shaft. Mandrel CM is shown in outline in FIGS. 11–17 and in detail in FIGS. 29 and 30. Ship S is then spirally wrapped about sleeve 60 as indicated in FIG. 12, the side edges of the ship are disposed in tight abutment as shown at 65 in FIG. 14. Adhesive 38 secures the ship to the sleeve. The strip S extends from the underside of the cap 62 to the top of guide cylinder 64. The resulting assembly of sleeve and ship may be marketed as a replacement grip or as original equipment installed on a complete golf club. (The so-called slip-on grip in the golf industry.) When the strip G is wrapped about the sleeve 60, the radially extending surfaces of the strip butt tightly together as shown at 65 in FIG. 14.

Figure 13:
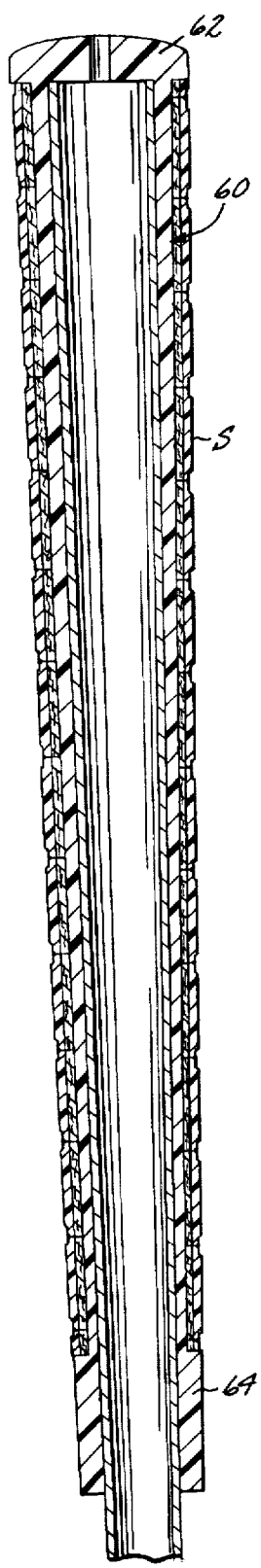
FIG. 13 is vertical sectional view showing the strip and sleeve of FIG. 12 supported on a collapsible mandrel.

Referring to FIGS. 13 and 14, the recessed reinforcement side edges 42 and 44 increase the strength of the butt joint between such edges, inhibit unraveling of the strip from sleeve 60, enhance the frictional contact between a golfer's hands and the grip and provides an improved appearance over existing golf club grips. Moreover, such recessed reinforcement side edges reduce interference with other golf club grips when a golf club is removed from a golf bag so as to reduce wear and tear on such grips.

Figure 15:
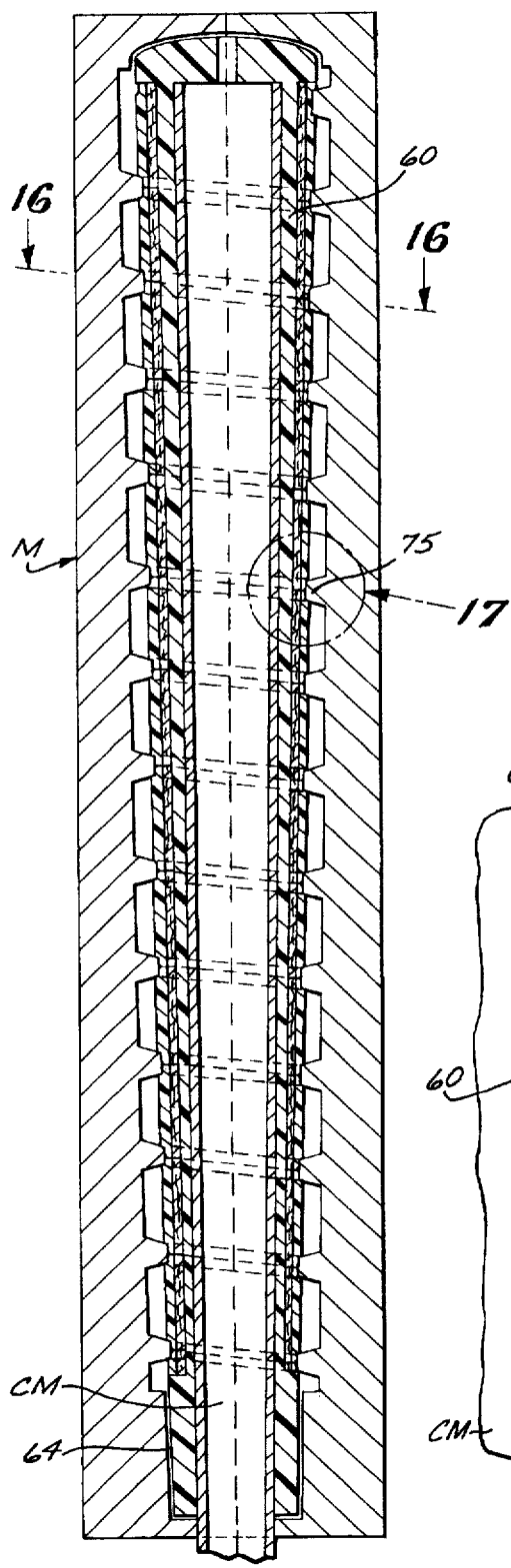
FIG. 15 is a vertical sectional view of heat applying mold which may be utilized to bond together the reinforcement side edges of the aforedescribed golf club grip.
Figure 17:
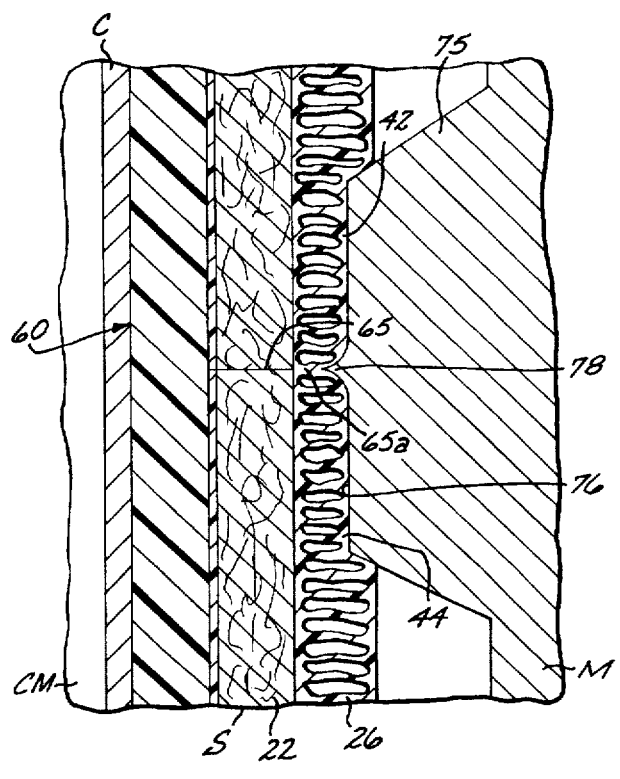
FIG. 17 is an enlarged view of the encircled area designated 17 in FIG. 15.

Referring now to FIG. 15 there is shown a heat-applying mold M which may be utilized to heat bond the recessed reinforcement side edges 42 and 44 of the sleeve and strip, shown in FIG. 13, together so as to provide an improved unitary, integral grip embodying the present invention. Heat-applying mold M may be of a split type having semicircular members 70 and 72 hinged along one edge at 74. The mold M is heated by electric resistant elements (not shown) in a conventional manner. The mold members 70 and 72 are formed along their length with a spirally configured radially inwardly extending protrusion 75 arranged in a spiral pattern and spaced as to coincide with the abutting reinforcement edges 42 and 44 after the strip S has been wrapped around sleeve 60 of FIGS. 11–14. As indicated in FIG. 17 the protrusion 75 includes at its radially inward portion a vertically extending face 76. The width of face 76 generally corresponds to the width of the recessed reinforcing side edges 42 and 44. Face 76 is provided at its midsection with a radially inwardly extending pointed tooth 78 that projects between the abutting surfaces 65 of the strip. When heat is applied to the protrusion 75, the polyurethane layer 26 of the abutting surfaces 65 will be bonded together along the length of the adjoining reinforcing side edges of the ship 42 and 44 as indicated in FIG. 17 at 65a. Such bonding effectively prevents separation of the reinforcing side edges over the life of the grip.

Referring now to FIG. 18 there is shown the upper or handle portion 80 of a golf club shaft adapted to receive a strip G of the aforedescribed nature to define a grip embodying the present invention. It should be noted that the handle portion 80 extends radially upwardly and radially outwardly rather than being configured with a constant diameter cross-section as in conventional golf club shafts. A conventional robber-like cap 82 is telescopically received by the upper end of the shaft. In FIG. 20 ship is shown being wrapped around the handle portion 80 of FIG. 18. It should be understood that when the strip is so wrapped about the golf club shaft the radially extending surfaces of the recessed reinforcement side edges 42 and 44 will butt tightly against one another as shown at 65.

It should be noted that usually the ship G will be spirally wrapped about golf club shaft as shown in FIG. 20 to define a grip embodying the present invention. It is possible, however, to provide a unitary grip directly on a golf club shaft by disposing the wrapped upper portion of golf club shaft 80 in a heat applying mold M shown and described hereinbefore with reference to FIGS. 15–17.

Figure 23:
FIG. 23 is a perspective view of a sleeve for a putter grip embodying the present invention.
Figure 24:
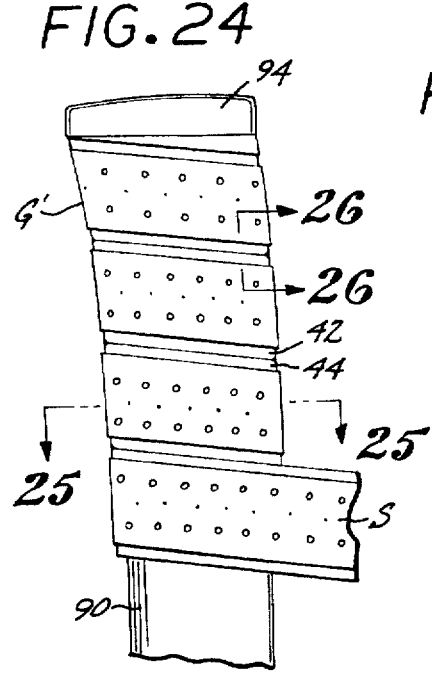
FIG. 24 is a broken side elevational view showing a ship made in accordance with the present invention being wrapped about the sleeve of FIG. 23.
Figure 25:
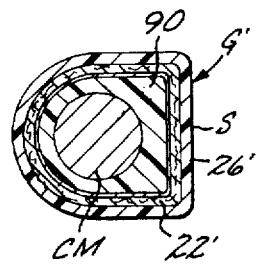
FIG. 25 is a horizontal sectional view taken along line 25—25 of FIG. 24.
Figure 26:
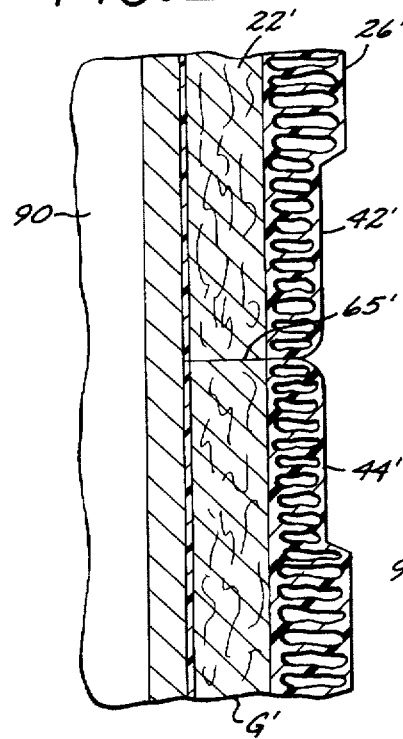
FIG. 26 is a vertical sectional view taken along line 26—26 of FIG. 24.
Figure 27:
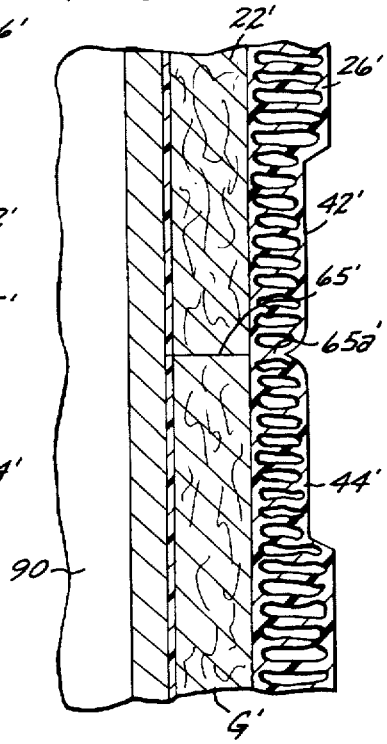
FIG. 27 is a view similar to FIG. 26 after the reinforcement side edges of the strip have been heat bonded together.

Referring now to FIGS. 23–27, there is shown a resilient grip G' embodying the present invention which may be used on a golf putter. FIG. 23 shows a resilient rubber-like sleeve 90 similar to the sleeve 60 of FIG. 11 applied to the handle portion of a collapsible mandrel CM. The upper end of sleeve 90 utilizes an integral cap 94, while the lower end thereof is formed with a guide cylinder 96. As indicated in FIG. 24, a ship G of the type described hereinbefore is spirally wrapped about sleeve 90 to form a unitary grip G embodying the present invention. FIGS. 26 and 27 are similar to FIGS. 21 and 22, and like parts bear primed reference numerals. These two figures show how the polyurethane layer 26' can be heat bonded together, if desired, at the point of abutment of adjoining recessed reinforcement side edges 42' and 44' by a heat applying mold (not shown) of the type described hereinbefore in connection with FIGS. 15–17 to provide an improved unitary grip.

Figure 16:
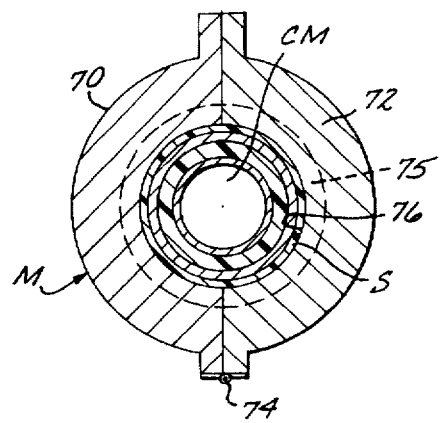
FIG. 16 is a generally horizontally extending sectional view taken along line 16—16 of FIG. 15.

Referring now to FIGS. 28–33 there is shown a method of forming a grip embodying the present invention using the heat-applying mold M of FIGS. 15, 16 and 17. In FIG. 28 a resilient strip G such as that shown in FIG. 1, is depicted spirally wrapped about a rubber sleeve which is in turn slipped over the top of a collapsible mandrel CM of conventional construction. After the strip has been spirally wrapped about mandrel CM, the mandrel and wrapped strip S are positioned within a heat-applying mold M similar in construction and operation to the heat-applying mold M described hereinbefore. When the mandrel and its overlapped strip are positioned within mold M the exterior surface of the polyurethane layer 26 will present a smooth appearance along the length of the strip.

Figure 32:
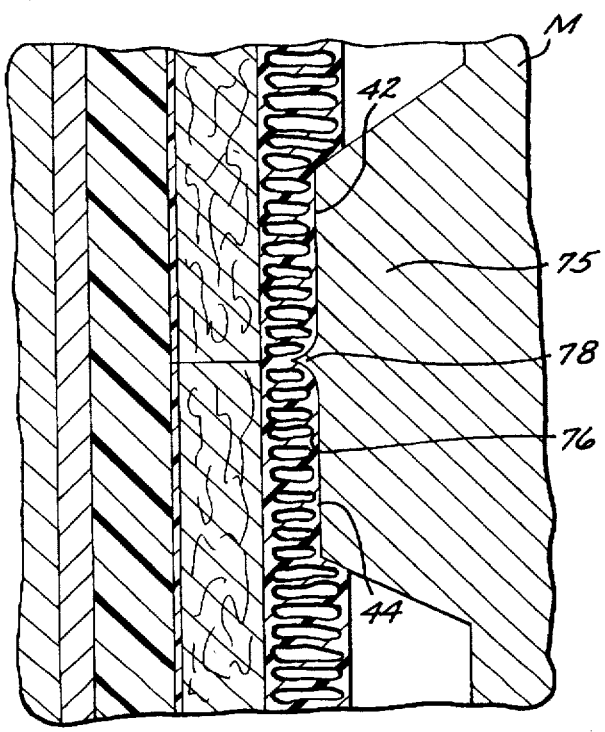
FIG. 32 is an enlarged view of the encircled area designated 32 in FIG. 29 showing a recessed resilient reinforcing side edge being formed in the resilient strip of FIGS. 29–31 by the mold of FIG. 29.
Figure 33:
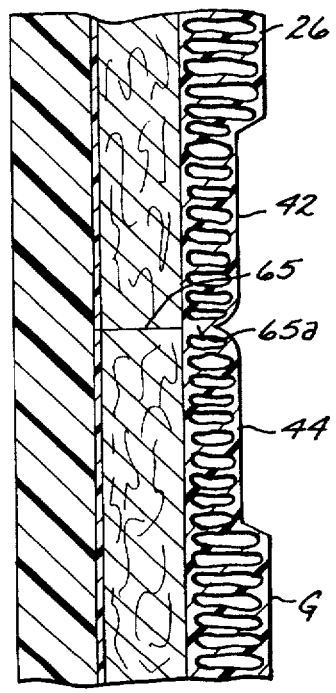
FIG. 33 is a view similar to FIG. 32 showing the construction of a grip embodying the present invention made with the mold of FIGS. 29 and 30.

Referring now to FIG. 32, when the spirally configured, radially inwardly extending protrusion 75 is heated, such protrusion will form recessed reinforcement side edges 42 and 44 in the polyurethane layer 26 of the strip. Additionally, the radially extending pointed tooth 78 will simultaneously bond the polyurethane layer of the abutting radially extending surfaces 65 together along the length of the adjoining recessed reinforcing side edges, as indicated in FIG. 33 at 65a, so as to eliminate any seam between the abutting side edges of the grip. After the recessed reinforcing side edges have been formed and the polyurethane layer has been bonded, mandrel CM will be collapsed and the completed unitary grip removed therefrom. It will be understood that by utilizing the method shown in FIGS. 28–30 the polyurethane compacting step provided by heating platen P shown in FIG. 5 can be eliminated.

It will be apparent to those skilled in the art that various modifications can be made without departing from the spirit and scope of the present invention. Accordingly, it is not intended that the invention be limited except by the appended claims.

What is claimed is:

1. The combination of a handle of an impact imparting device and a resilient grip, comprising:

a strip consisting of an open-pored felt layer having a generally flat inner surface facing the handle and an outer surface, and a flat closed pore polyurethane layer having its inner surface bonded to the outer surface of the felt layer, with the pores of such polyurethane layer extending generally normal to the longitudinal axis of the ship, and with the felt layer providing strength for the polyurethane layer while the polyurethane layer both absorbs shocks and provides tackiness so as to inhibit slippage of a user's hand relative to a handle;

heat compressed reinforcement side edges formed in the polyurethane layer of the ship along the length of the ship; and the strip being spirally wrapped about the handle to define said grip with the side edges of the felt layer being in tight abutment whereby the exterior surface of the ship is of non-overlapping configuration, unraveling of the ship is inhibited, the strength of the side edges is increased and frictional contact between a user's hand and the grip is enhanced.

2. The combination of claim 1, wherein the ratio of the thickness of the polyurethane layer to the felt layer is a minimum of about 0.18 millimeters.

3. The combination of claim 1, wherein the starting end of the ship is formed with slanted leading and trailing areas.

4. The combination of claim 1, wherein the ship is formed with perforations.

5. The combination of claim 1, wherein the strip is adhered to the handle by an adhesive applied over the surface of the felt layer opposite the polyurethane layer.

6. The combination of claim 1, where the handle is a tennis racquet handle and wherein the strip is applied to such handle by an adhesive applied over the surface of the felt layer opposite the polyurethane layer.

7. The combination of claim 1, where the handle is a golf club handle.

8. The combination of claim 7, which further includes a resilient sleeve applied to the handle and the strip is spirally wrapped about the sleeve.

9. The combination of claim 8, wherein the width of the reinforced side edges is approximately 2 millimeters while the depth of the major portion of such side edges approximates 0.5 millimeters.

10. The combination of claim 1, wherein the handle is an upwardly and outwardly tapered golf club handle, and the ship is spirally wrapped directly onto the handle of the golf club.

11. The combination of claim 1, wherein the width of the reinforced side edges is approximately 2 millimeters while the depth of the major portion of such side edges approximates 0.5 millimeters.

12. A method of making a resilient handle grip, such method comprising:

forming a strip consisting of an open-pored felt layer having a generally flat inner surface to encompass the handle, an outer surface and side edges, and a flat closed pore polyurethane layer having its inner surface bonded to the outer surface of the felt layer, with the pores of such polyurethane layer extending generally normal to the longitudinal axis of the strip, and with the felt layer providing strength for the polyurethane layer while the polyurethane layer both absorb shocks and provides tackiness so as to inhibit slippage of a user's hand relative to said handle; and applying a heated platen against the side edges of the polyurethane layer with sufficient pressure to compress the material of the polyurethane layer to increase the strength of the polyurethane and define heat compressed reinforced side edges on the grip.

13. The method of claim 12, wherein the ratio of the thickness of the polyurethane layer to the felt layer is about 0.18.

14. A method of making a slip-on resilient handle grip, such method comprising:

forming a strip consisting of an open-pored felt layer having a generally flat inner surface to encompass the handle and a flat closed pore polyurethane layer having its inner surface bonded to the outer surface of the felt layer, with the pores of such polyurethane layer extending generally normal to the longitudinal axis of the strip, and with the felt layer providing strength for the polyurethane layer while the polyurethane layer both absorb shocks and provides tackiness so as to inhibit slippage of a user's hand relative to said handle;

spirally wrapping the strip about a tapered element with the radially extending surfaces of the side edges of the strip being in tight abutment whereby the exterior surface of the strip is of smooth non-overlapping configuration and simultaneously heating and compressing the sides of the polyurethane strip to define recessed reinforced side edges along the length of the strip; and heat bonding such side edges together.

15. The method of claim 14, wherein the ratio of the thickness of the polyurethane layer to the felt layer is about 0.18.

16. A method as set forth in claim 14, where the tapered element is a resilient sleeve that is supported by a collapsible mandrel during the compressing and bonding steps, to provide a unitary grip that is slipped over the handle.

* * * * *

UNITED STATES PATENT AND TRADEMARK OFFICE
CERTIFICATE OF CORRECTION

PATENT NO.  : 5,730,669
DATED       : March 24, 1998
INVENTOR(S) : Ben Huang

It is certified that error appears in the above-identified patent and that said Letters Patent is hereby corrected as shown below:

```
Column 1, line 30, delete "stalking" and insert
          --striking--;
Column 2, lines 50-51, delete "robber-like" and insert
          --rubber-like--;
Column 3, line 26, delete "mandel" and insert --mandrel--;
Column 3, line 49, delete "ship" and insert --strip--;
Column 3, line 55, delete "ship" and insert --strip--;
Column 3, line 58, delete "ship" and insert --strip--;
Column 5, line 19, delete "ship" and insert --strip--;
Column 5, line 56, delete "ship" and insert --strip--;
Column 6, line 16, delete "robber" and insert --rubber--;
Column 6, line 20, delete "ship" and insert --strip--;
Column 6, line 21, delete "robber-like" and insert
          --rubber-like--;
Column 6, line 22, delete "robber" and insert --rubber--;
Column 6, line 26, delete "mandel" and insert --mandrel--;
Column 6, line 30, delete "Ship" and insert --Strip--;
Column 6, line 33, delete "ship" and insert --strip--;
```

UNITED STATES PATENT AND TRADEMARK OFFICE
CERTIFICATE OF CORRECTION

PATENT NO. : 5,730,669
DATED : March 24, 1998
INVENTOR(S) : Ben Huang

It is certified that error appears in the above-identified patent and that said Letters Patent is hereby corrected as shown below:

```
Column 6, line 35, delete "ship" and insert --strip--;
Column 7, line 5, delete "ship" and insert --strip--;
Column 7, line 16, delete "robber-like" and insert
                   --rubber-like--;
Column 7, line 17, delete "ship" and insert --strip--;
Column 7, line 38, delete "ship" and insert --strip--;
Column 8, line 25, delete "ship" and insert --strip--;
Column 8, line 30, delete "ship" and insert --strip--;
Column 8, line 31, delete "ship" and insert --strip--;
Column 8, line 34, delete "ship" and insert --strip--;
Column 8, line 36, delete "ship" and insert --strip--;
Column 8, line 43, delete "ship" and insert --strip--;
Column 8, line 44, delete "ship" and insert --strip--;
Column 8, line 64, delete "ship" and insert --strip--.
```

Signed and Sealed this

Ninth Day of June, 1998

Attest:

BRUCE LEHMAN

*Attesting Officer*  *Commissioner of Patents and Trademarks*